United States Patent [19]

Oliapuram

[11] 4,207,383

[45] Jun. 10, 1980

[54] NEGATIVE, HIGHLY ACTIVE IRON ELECTRODE

[75] Inventor: V. Anthony Oliapuram, Frankfurt am Main, Fed. Rep. of Germany

[73] Assignee: Varta Batterie Aktiengesellschaft, Hanover, Fed. Rep. of Germany

[21] Appl. No.: 903,203

[22] Filed: May 5, 1978

[30] Foreign Application Priority Data

Jun. 18, 1977 [DE] Fed. Rep. of Germany ....... 2727393

[51] Int. Cl.$^2$ ............................................ H01M 4/24
[52] U.S. Cl. ...................................... 429/48; 429/221
[58] Field of Search .................... 429/48, 221, 209; 427/421, 435

[56] References Cited

U.S. PATENT DOCUMENTS

| | | | |
|---|---|---|---|
| 2,661,387 | 12/1953 | Ackermann et al. | 429/221 |
| 3,507,696 | 4/1970 | Jackovitz et al. | 429/221 X |
| 3,836,397 | 9/1974 | Hardman | 429/221 X |
| 3,853,624 | 12/1974 | Brown et al. | 429/221 |

*Primary Examiner*—Anthony Skapars
*Attorney, Agent, or Firm*—Weiser, Stapler & Spivak

[57] ABSTRACT

A negative, highly active iron electrode for an electrical storage battery is coated with a sulfur based protective layer to impede premature oxidation and increase charge capacity.

11 Claims, No Drawings

NEGATIVE, HIGHLY ACTIVE IRON ELECTRODE

The invention relates to a negative, highly active iron electrode for electrical storage batteries, as well as a method for their manufacture. Cells with negative iron electrodes, as for example the Ni/Fe cell, are among the oldest electrochemical current sources. Despite an initial success, the Ni/Fe cell soon had to yield ground to the Ni/Cd storage battery, because the iron electrode was unsatisfactory due to its low useful electrochemical yield and its high self-discharge.

The self-discharge of the iron electrode is caused by the fact that the rest potential of the iron contacting an aqueous electrolyte lies outside its thermodynamic stability limits, so that continuous oxidation of the metal takes place. For this reason, the electrode also has poor charge capacity. Through mercury amalgamation of the iron, the self-discharge is susceptible of being reduced.

The procedure for manufacturing the active mass of the iron electrode, which goes all the way back to Edison, remained essentially unchanged until the most recent past. In accordance with that procedure, pure iron is dissolved in sulfuric acid and the solution is dehydrated at 100° C. The product is ground and roasted in air at 800°–900° C. The resulting oxidation product, which consists almost entirely of $Fe_2O_3$, then has the soluble residues washed out and is dried. The dried mass is reduced in hydrogen at 480° C. to metallic iron. Before opening the reduction vessel, the mass is moistened with water in order to produce a surface oxidation layer. This surface protective layer protects the active mass from further oxidation.

To improve the performance of iron electrodes, it is primarily desired to activate the electrode through appropriate additives or rather to prevent premature passivation. Such measures generally include introducing sulfur compounds either directly into the negative mass, or via the electrolyte, into the finished electrode.

Thus, German patent publication (Auslegungsschrift) No. 1,696,570 describes the production of negative iron electrodes by mixing Fe powder with FeS, CdS, or $In_2S_3$ and sintering the mixture in a reducing $H_2$ stream. Alternatively, a sintered, sulfur-free Fe electrode may be saturated with water soluble sulfur compounds ($Na_2S$, $K_2S$, $Na_2S_2O_3$).

In accordance with U.S. Pat. No. 3,507,696, flowers of sulfur is mixed with various iron oxide powders, the mixture is heated in the absence of air, and the cake which precipitates after cooling is ground. This mass is then coated or pasted onto a fibrous or porous electrode frame.

It is also possible to introduce sulfur into the negative mass by reacting iron oxide mixtures with sulfur substituted organic acids, as taught in German Patent publication (Offenlegungsschrift) No. 2,206,828.

All of these methods have the drawback that the newly produced electrodes must then be activated through electrochemical reduction. This leads to higher manufacturing costs. Otherwise they can only be stored in the absence of air inasmuch as they are already present in metallic form, for example as sintered electrodes.

Accordingly, it is a principal object of the invention to provide a technique for preserving the newly produced highly active iron electrode in which this activity is long maintained.

This and other objects which will appear are achieved by coating the electrode with an oxidation impeding, protective layer.

This protective layer preferably consists of sulfur, however, selenium may, for example, also be used. The layer is produced by immersing the electrodes in molten sulfur, for example. Instead of a melt of pure sulfur, the immersion bath may also be a solution of sulfur in an organic solvent, such as carbon disulfide or benzol. In this manner, a thin protective film is obtained, the thickness of which must, however, be so dimensioned as to be reliably free of pores. This requires a thickness of at least 15 to 20 microns.

Instead of immersion, the electrodes may also be subjected to a spray treatment of liquid sulfur or of a sulfur solution.

Finally, it is possible to protect newly produced iron powder itself from oxidation in accordance with one of the above-mentioned methods and to later press iron powder so treated into electrodes.

The method according to the invention is particularly suitable for iron-sintered electrodes which are strongly subject to oxidation due to their large internal surface. The electrodes are completely coated and protected by the sulfur layer so that the active material retains its activity almost indefinitely. Renewed reduction prior to usage becomes unnecessary and this results in a cost saving. Only in the presence of lye, after the electrode plates protected in accordance with the invention have been installed and the cell has been filled with electrolyte, does the sulfur begin to work upon the reactive iron resulting in the formation of iron sulfate. This occurs preferentially along the grain boundaries of the crystalline iron as well as other, energetically preferred locations. As a result, an increase in the crystalline density of the iron mass and reduction of its activity are counteracted right from the start.

The protective layer produced according to the invention therefore makes it unnecessary to use special activating additives because its function changes automatically into that of an activator when the cell is put into use.

We claim:

1. A negative, highly active metallic iron electrode for an electrical storage battery wherein the electrode is coated with an oxidation impeding protective layer of sulfur or selenium.

2. The electrode of claim 1 wherein the protective layer is of sulfur.

3. The electrode of claim 1 wherein the protective layer is of selenium.

4. The electrode of claim 1 wherein the protective layer is substantially free of pores.

5. The electrode of claim 4 wherein the protective layer is at least 15 to 20 microns in thickness.

6. The electrode of claim 1 wherein the electrode is an iron sintered electrode.

7. The electrode of claim 1 wherein the electrode is formed by steps which include pressing powdered iron into the shape of the electrode, and the protective layer is applied to the powder prior to the pressing.

8. The electrode of claim 1 wherein the electrode is formed by steps which include pressing powdered iron into the shape of the electrode, and the protective layer is applied to the powder after the pressing.

9. A negative, highly active metallic iron electrode for an electrical storage battery which is formed by steps which include providing the electrode with newly produced, not-yet-oxidized powdered iron, and
providing the surface of the electrode with a substantially pore free coating of sulfur or selenium.

10. The electrode of claim 9 wherein
the coating is provided by immersion of the electrode into a bath of sulfur.

11. The electrode of claim 9 wherein
the coating is provided by spraying of the electrode with sulfur.

* * * * *